(12) United States Patent
Wang et al.

(10) Patent No.: US 10,207,817 B2
(45) Date of Patent: Feb. 19, 2019

(54) STATIC DISCHARGER, AIRCRAFT AND INSTALLATION PROCESS FOR THE STATIC DISCHARGER

(71) Applicant: AIRBUS (BEIJING) ENGINEERING CENTRE COMPANY LIMITED, Beijing (CN)

(72) Inventors: Long Wang, Beijing (CN); Zengli Han, Beijing (CN)

(73) Assignee: AIRBUS (BEIJING) ENGINEERING CENTRE COMPANY LIMITED, Beijing (CN)

( * ) Notice: Subject to any disclaimer, the term of this patent is extended or adjusted under 35 U.S.C. 154(b) by 418 days.

(21) Appl. No.: 15/069,814

(22) Filed: Mar. 14, 2016

(65) Prior Publication Data

US 2016/0264258 A1    Sep. 15, 2016

(30) Foreign Application Priority Data

Mar. 13, 2015    (CN) .......................... 2015 1 0111311

(51) Int. Cl.
*B64D 45/02* (2006.01)
*H05F 3/02* (2006.01)
*H02G 13/00* (2006.01)

(52) U.S. Cl.
CPC ............. *B64D 45/02* (2013.01); *H02G 13/80* (2013.01); *H05F 3/02* (2013.01)

(58) Field of Classification Search
CPC ............ B64D 45/02; H02G 13/80; H05F 3/02
See application file for complete search history.

(56) References Cited

U.S. PATENT DOCUMENTS

| 2,502,496 A | * | 4/1950 | Wickman | ............. | B60P 3/2275 |
|  |  |  |  |  | 242/378.4 |
| 3,558,976 A | * | 1/1971 | Miller | .................... | B64D 45/02 |
|  |  |  |  |  | 361/218 |
| 3,617,805 A | * | 11/1971 | Truax | .................... | B64D 45/02 |
|  |  |  |  |  | 361/218 |

(Continued)

OTHER PUBLICATIONS

European Search Report dated Jul. 19, 2016 EP Application No. 16160237.

*Primary Examiner* — Zeev V Kitov
(74) *Attorney, Agent, or Firm* — Nixon & Vanderhye P.C.

(57) ABSTRACT

The present invention relates to a static discharger, an aircraft, and an installation process for the static discharger. According to an aspect of the present invention, a static discharger is provided which includes: a basement; and a discharger body installed to the basement. An installation orientation adjusting mechanism is provided between the basement and the discharger body, and the installation orientation adjusting mechanism allows the discharger body to be rotationally orientated, with respect to the basement, to a predetermined installation orientation during an on-site-installation of the static discharger. The static discharger further includes a first fixing mechanism adapted to fix the discharger body, which has been oriented to the predetermined installation orientation, to the basement. According to the present invention, for example, installation adaptation and universality of the static discharger and adjustment and determination of installation orientation of the static discharger can be improved.

23 Claims, 9 Drawing Sheets

(56) References Cited

U.S. PATENT DOCUMENTS

| | | | | |
|---|---|---|---|---|
| 4,080,643 | A | * | 3/1978 | Cline ................ B64D 45/02 361/218 |
| 4,262,321 | A | * | 4/1981 | Cline ................ B64D 45/02 361/218 |
| 4,513,347 | A | * | 4/1985 | Wilcox ................ H05F 3/02 361/212 |
| 4,747,011 | A | * | 5/1988 | Lissner ................ H05F 3/02 297/217.1 |
| 2005/0002145 | A1 | | 1/2005 | Elon |

* cited by examiner

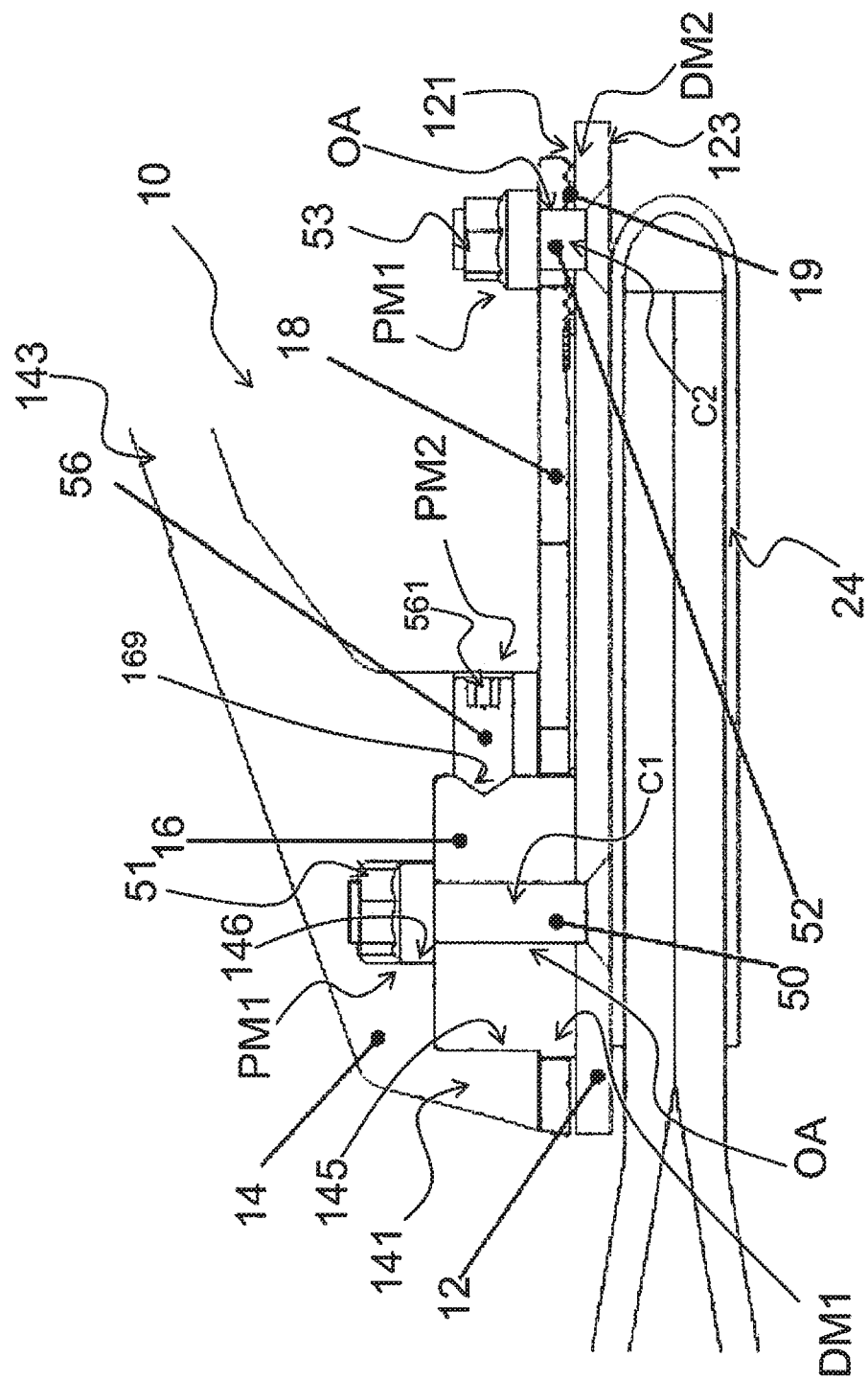

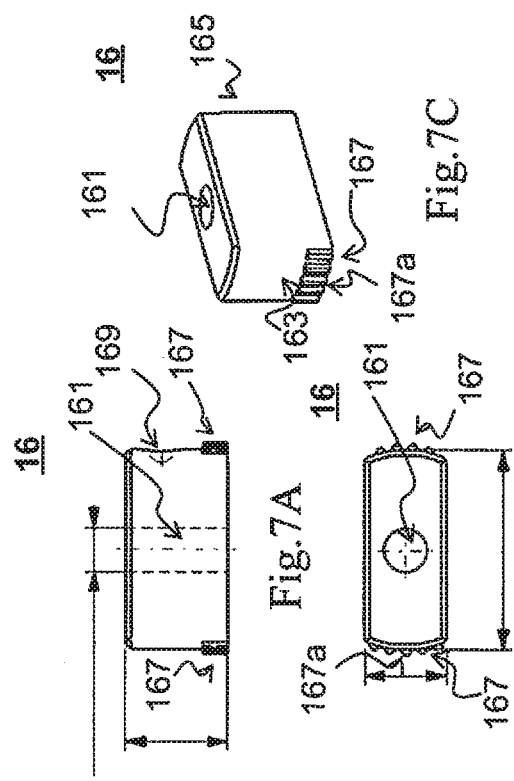

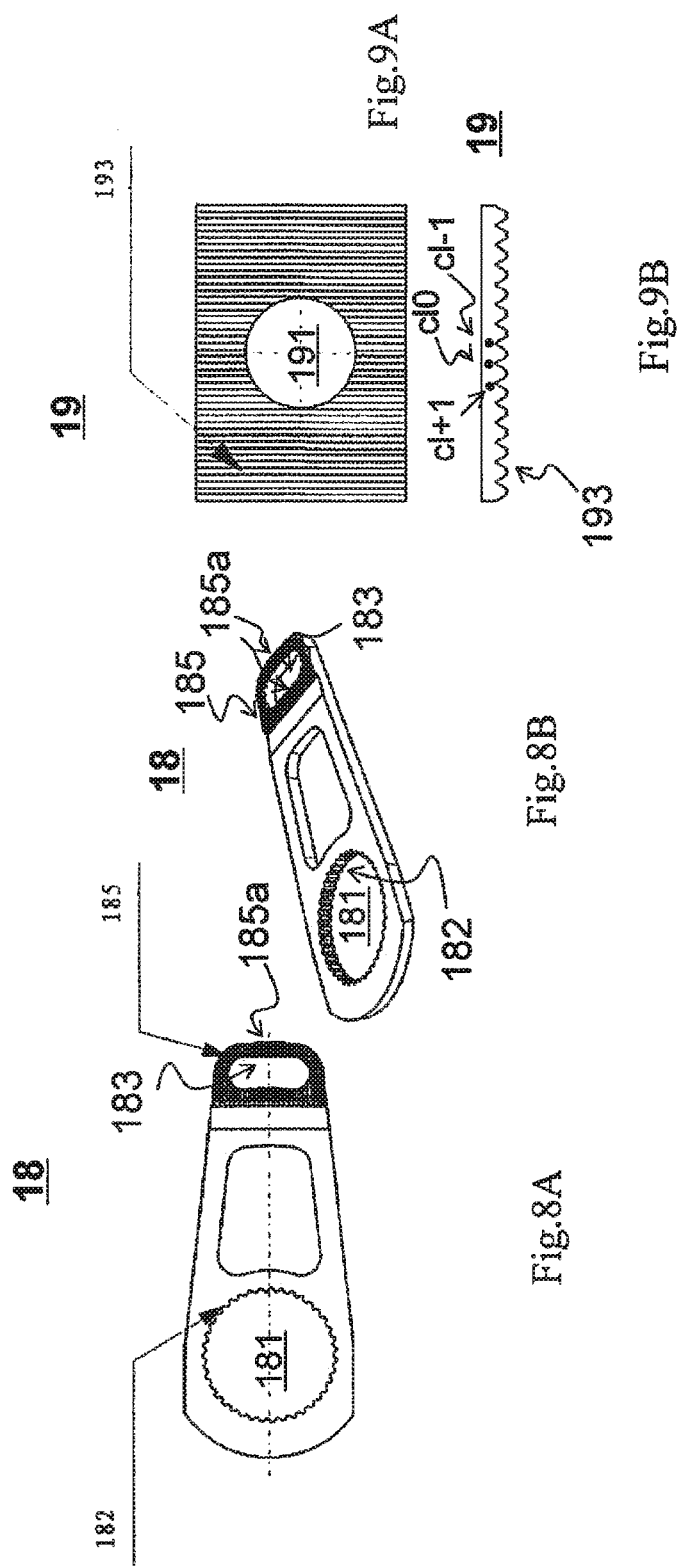

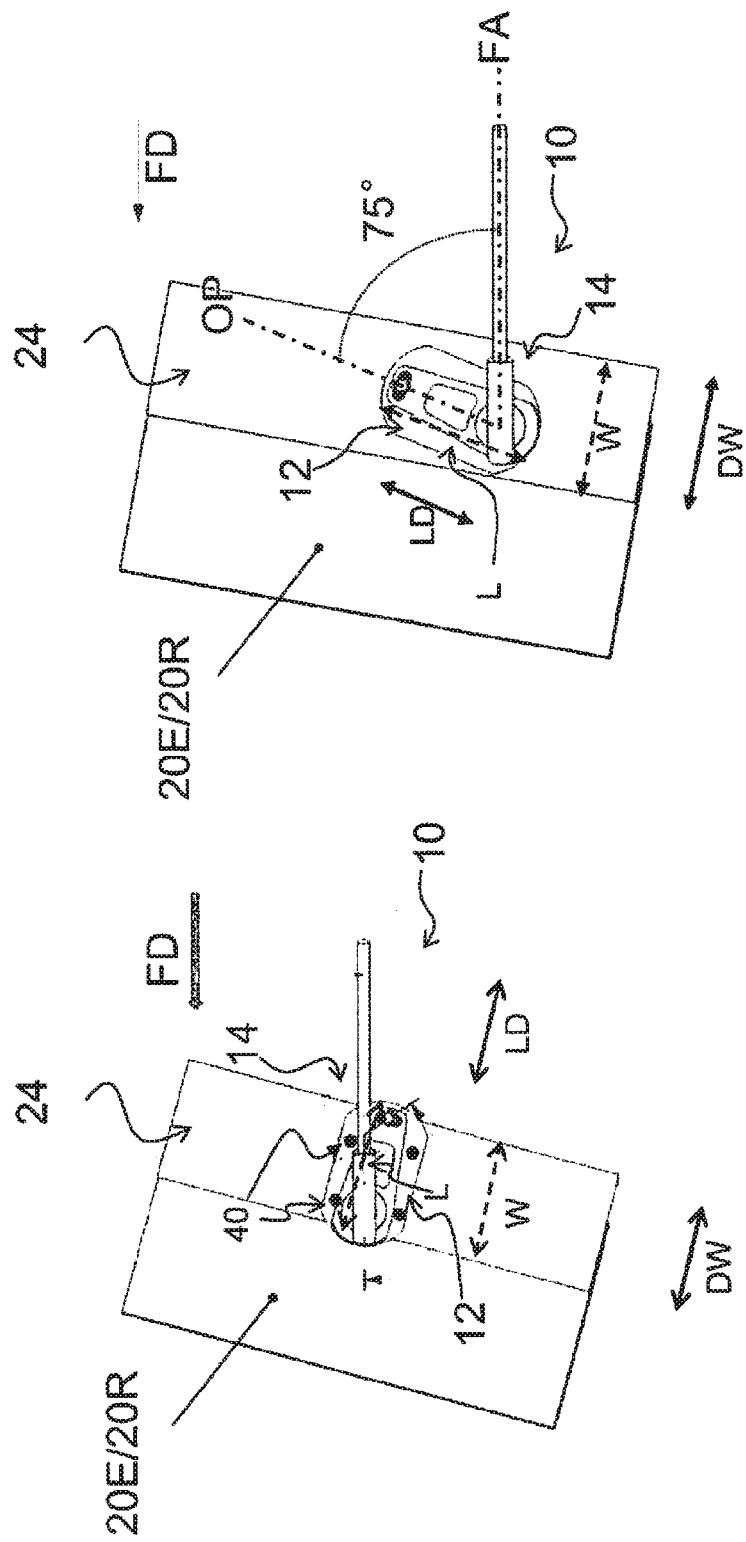

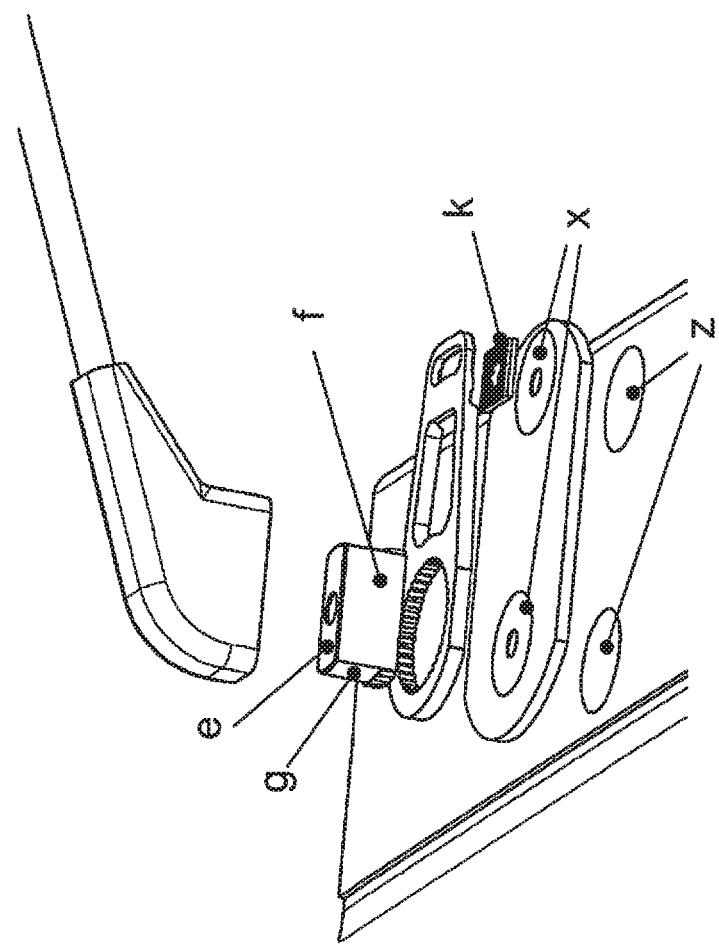
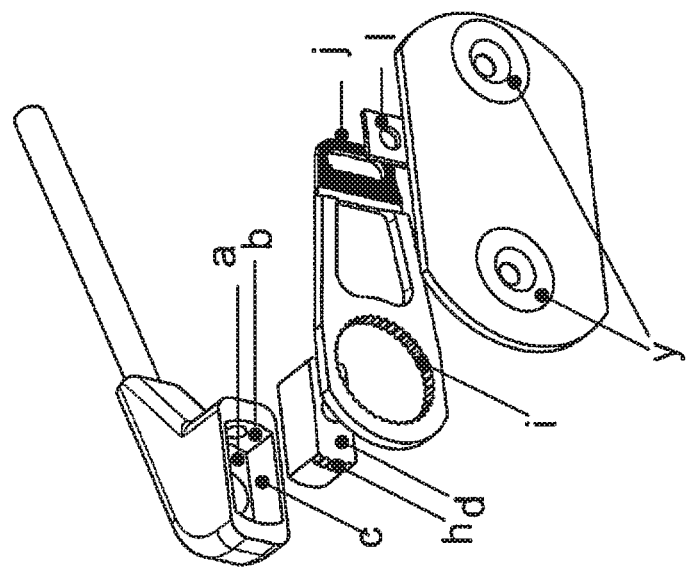
Fig. 12A
Fig. 12B

STATIC DISCHARGER, AIRCRAFT AND INSTALLATION PROCESS FOR THE STATIC DISCHARGER

RELATED APPLICATIONS

This application claims priority to Chinese Patent Application No. 201510111311.X, filed Mar. 13, 2015, which is incorporated by reference in its entirety herein.

FIELD OF THE INVENTION

The present invention relates to a static discharger, an aircraft having the same, and an installation process for the same, and more particularly to a static discharger improved in aspects of, for example, installation adaptation and universality, adjustment and determination of installation orientation, and so on.

BACKGROUND OF THE INVENTION

Generally, high-speed moving bodies such as the airplane, the aerospace plane, the train and the automobile are provided with a static discharger. In particular, the static discharger is an essential component in the airplane used to protect relevant structures of the airplane by discharging the current (static electricity) to the air slowly. The static discharger may be installed at the wing (for example, a trailing edge of the external aileron and/or a trailing edge of the winglet), the VTP (vertical fin plane), the HTP (horizontal fin plane), the rudder and/or the elevator.

Referring to FIG. 1 (FIG. 1 is a schematic view for illustrating a situation where a static discharger according to the relevant technology is installed on a rudder of an airplane), the static discharger 10A according to the relevant technology includes a basement 12A and a discharging portion 14A. The static discharger 10A is installed on the rudder 20A (only a part of the rudder 20A is shown in FIG. 1) of the airplane. Generally, the basement 12A is a substantially rectangular plate. The discharging portion 14A is fixedly installed at or integrally formed at a transversely middle position of the basement 12A along a longitudinal direction of the basement 1A. The rudder 20A is provided, at a trailing edge 22A thereof, with a trailing edge profile member 24A which is made of metal. The trailing edge profile member 24A generally has a U-shaped cross section and is configured to envelop the trailing edge 22A of the rudder 20A (in FIG. 1, the trailing edge profile member 24A envelops the trailing edge 22A of the rudder 20A from the right side). With the basement 12A of the static discharger 10A being installed on the trailing edge profile member 24A of the rudder 20A, the static discharger 10A is mechanically fixed to the rudder 20A and at the same time conductively connected to the rudder 20A (that is, the trailing edge profile member 24A) and thus to other relevant structures of the airplane.

On the one hand, according to the design requirements of the airplane, a width FDW of the trailing edge profile member 24A along the flight direction FD of the airplane is generally small (for example, it is required that the width of the trailing edge profile member for a certain model of airplane be within the range of 50 to 55 mm). On the other hand, In order to ensure stable installation and sufficient electrical contact area of the static discharger 10A, the area and then the length L of the basement 12A should not be too small (for example, the length of the basement for a certain model of airplane is 82 mm). Therefore, the length L of the basement 12A is generally larger than the width FDW of the trailing edge profile member 24A. On still another aspect, in order to minimize the windage caused by the discharging portion 14A and to minimize the force (the wind force) suffered by the discharging portion 14A, it is required that the discharging portion 14A be installed in a direction in line with the flight direction FD (for example, in the example shown in FIG. 1, the static discharger 10A and the discharging portion 14A thereof should be orientated in the way shown in the figure with respect to the rudder 20A).

Therefore, as shown in FIG. 1, in the static discharger 10A according to the relevant technology, in order to avoid instable installation and/or poor electrical contact caused by the condition in which the basement 12A of the static discharger 10A is directly installed to the trailing edge profile member 24A in a partially suspended manner, an additional metallic plate 30A is needed via which the static discharger 10A is installed on the rudder 20A (the metallic plate 30A is directly installed on the t ailing edge profile member 24A in a partially suspended manner, and then the basement 12A is installed on the metallic plate 30A by a fastener 40A).

In this way, in the static discharger 10A according to the relevant technology, since an additional metallic plate 30A is needed for the installation, the weight is increased, the installation is complex, and the aerodynamic surface is affected. In addition, the partially suspended installations of the metallic plate 30A and the basement 12A may also affect the aerodynamic surface (which will cause turbulence effect) and cause inconvenient installation. Still another, the structure in which the discharging portion 14A is fixedly connected to or integrally formed with the basement 12A may cause a problem that the static discharger 10A (in particular, the basement 12A) cannot be flexibly adapted to the trailing edge profile member 24A of the rudder 20A which is relatively narrow, and particularly, the angles of the discharging portion 14A with respect to the basement 12A and to the rudder 20A (the trailing edge profile member 24A) cannot be flexibly adjusted based on the practical situation on the installation site, and thus it is difficulty to ensure that the discharging portion 14A is installed in line with the flight direction FD.

Referring to FIG. 2 (FIG. 2 is a schematic view which illustrates a situation where another static discharger according to the relevant technology is installed on an elevator of an airplane), the static discharger 10B according to the relevant technology may also include a basement 12B and a discharging portion 14B. The discharging portion 14B is installed on the elevator 20B.

In the static discharger 10B according to the relevant technology, similarly, a length L of the basement 12B is generally larger than a width FDW of a trailing edge profile member 24B of the elevator 20B along the flight direction FD of the airplane. As shown in FIG. 2, the static discharger 10B is installed to the elevator 20B in a manner different from the partially suspended manner shown in FIG. 1. However, in this different installing manner, it also need an additional metallic plate 30B to improve the electrical contact between the static discharger 10B and the elevator 20B (the trailing edge profile member 24B), and to fill up the intersection region 28B, which is generally concave, between the trailing edge profile member 24B of the elevator 20B and the body region 26B of the elevator 20B, to ensure stable installation of the static discharger 10B.

In this way, in the static discharger 10B according to the relevant technology, similarly, since an additional metallic plate 30B is needed for the installation, the weight is increased, the installation is complex, and the aerodynamic surface is affected. In addition, since the metallic plate 30B and the basement 12B not only are installed on the trailing edge profile member 24B but also go upward and are installed on the body region 26B of the elevator 20B (which is also called as a bestriding installation manner), the metallic plate 30B and the basement 12B protrude upward at a higher degree, which not only affect the aerodynamic surface but also cause inconvenient installation. Still another, similarly, the structure in which the discharging portion 14B is fixedly connected to or integrally formed with the basement 12B may cause a problem that the static discharger 10B (in particular, the basement 12B) cannot be flexibly adapted to the trailing edge profile member 24B of the elevator 20B which is relatively narrow, and particularly, the angles of the discharging portion 14B with respect to the basement 12B and to the elevator 20B (the trailing edge profile member 24B) cannot be flexibly adjusted based on the practical situation on the installation site, and thus it is a difficulty to ensure that the discharging portion 14B is installed in line with the flight direction FD.

On the other hand, in the static discharger 10A and the static discharger 10B according to the relevant technology, since there is no an indexing mechanism (dividing mechanism), conveniently and accurately adjusting and determining the angle of the discharging portion with respect to the basement and to the rudder/elevator (the trailing edge profile member) cannot be achieved, and thus it is difficulty to ensure that the discharging portion is installed in line with the flight direction.

Herein, it is to be noted that the technical contents in this section are provided to help the person skilled in the art to understand the present invention, and they do not necessarily constitute a part of the prior art.

SUMMARY OF THE INVENTION

A general concept of the present invention is provided in this section, but this section does not involve a complete scope of the present invention or an overall disclosure of all the features of the present invention.

An object of the present invention is to provide a static discharger with which an installation/assembly manner of a basement and then the whole static discharger can be determined based on the practical circumstance on the installation site.

Another object of the present invention is to provide a static discharger with which a basement and then the whole static discharger can be flexibly adapted to a trailing edge profile member which is relatively narrow.

Another object of the present invention is to provide a static discharger with which an angle of a discharging portion with respect to a basement and to a trailing edge profile member can be flexibly adjusted based on the practical circumstance on the installation site, thereby making it easily to ensure that the discharging portion is installed to be in line with a flight direction.

Another object of the present invention is to provide a static discharger with which the universality of the static discharger can be improved and thus there is no need to prepare a series of different static discharger for different airplane models and installation positions etc.

Another object of the present invention is to provide a static discharger with which disadvantageous circumstances such as that the weight is increased, the assembly is complex and the aerodynamic surface is affected can be avoided.

Another object of the present invention is to provide a static discharger with which the electrical contact can be improved.

Another object of the present invention is to provide a static discharger with which an angle of a discharger body with respect to a basement and to a rudder/an elevator can be adjusted and determined conveniently and accurately.

Another object of the present invention is to provide a static discharger with which a discharger body can be orientated, based on a determined angle, with respect to a basement and to a rudder/an elevator conveniently, to further ensure that the discharger body is installed to be in line with a flight direction of an airplane.

Other objects of the present invention are to provide an aircraft including the above static discharger and an installation process for the above static discharger.

In order to achieve one or more of the above objects, according to an aspect of the present invention, a static discharger is provided comprising: a basement adapted to be installed to a supporting and conductive structure of a moving body; and a discharger body adapted to be installed to the basement. An installation orientation adjusting mechanism is provided between the basement and the discharger body, the installation orientation adjusting mechanism allowing the discharger body to be rotationally orientated, with respect to the basement, to a predetermined installation orientation during an on-site-installation of the static discharger. The static discharger further comprises a first fixing mechanism adapted to fix the discharger body, which has been oriented to the predetermined installation orientation, to the basement.

In order to achieve one or more of the above objects, according to another aspect of the present invention, an aircraft is provided. The aircraft comprises the static discharger as defined above.

In order to achieve one or more of the above objects, according to another aspect of the present invention, an installation process is provided for installing the static discharger as defined above to the supporting and conductive structure of the moving body. The installation process comprises the following steps: determining a basement installation orientation of the basement with respect to the supporting and conductive structure on an installation site in order that the basement can be superposed on the supporting and conductive structure to the greatest extent; determining a discharger body installation orientation of the discharger body with respect to the basement on the installation site in order that the discharger body can be orientated to be in line with a moving direction of the moving body; adjusting, based on the determined discharger body installation orientation and by means of the installation orientation adjusting mechanism, an installation orientation of the discharger body with respect to the basement, and then fixing the discharger body to the basement by means of the first fixing mechanism; and installing, based on the determined basement installation orientation, the basement together with the discharger body which has been fixed to the basement to the supporting and conductive structure.

According to the present invention, when the static discharger is taken away from the factory, the basement and the discharging portion (the discharger body) are not fixedly assembled or integrally formed with each other. Therefore, the assembly/installation manner of the basement and then the whole static discharger can be determined on the installation site based on circumstances such as dimension and orientation of the trailing edge profile member of the rudder and/or the elevator of the airplane, such that the basement and then the whole static discharger can be flexibly adapted to, for example, the relatively narrow trailing edge profile member of the rudder and/or the elevator. And in particular, the angle of the discharging portion (the discharger body) with respect to the basement and to the trailing edge profile member can be flexibly adjusted based on the practical circumstance on the installation site. Therefore, it is easy to ensure that the discharging portion (the discharger body) is installed in line with the flight direction. Thus, the universality of the static discharger is increased, and there is no need to prepare a series of different static dischargers for different models of airplane and installation positions etc.

In addition, according to the present invention, since no additional installation member such as a metallic plate is needed in the installation of the static discharger, disadvantageous circumstances such as that the weight is increased, the assembly is complex and the aerodynamic surface is affected can be avoided. Besides, the so called suspended installation manner or best installation manner can be avoided since generally the basement can be completely superposed on the flat trailing edge profile member, thus the electrical contact can be improved, the installation course can be further simplified and the affection on the aerodynamic surface can be further reduced.

In addition, according to the present invention, in particular, since indexing mechanisms (the first level indexing mechanism and the second level indexing mechanism) are provided and accordingly scales are provided thereon, and since at the same time the indexing mechanisms also play positioning roles through meshing of the teeth, angles of the discharging portion (discharger body) with respect to the basement and the rudder/elevator (trailing edge profile member) can be adjusted and determined (identified) conveniently and accurately, and the discharging portion (discharger body) can be positioned with respect to the basement and the rudder/elevator (trailing edge profile member) based on the determined angle, therefore it can further ensure that the discharging portion (discharger body) is installed in line with the flight direction.

BRIEF DESCRIPTION OF THE DRAWINGS

Features and advantages of one or more embodiments of the present invention will be understood more readily with reference to the description in conjunction with the drawings, and wherein:

FIG. 4 is a longitudinal section view showing a static discharger according to an exemplary embodiment of the present invention;

FIG. 7A to FIG. 7C are respectively a side view, a bottom view and a perspective view showing an internal-media according to an exemplary embodiment of the present invention;

FIG. 8A and FIG. 8B are respectively a bottom view and a perspective view viewed from a side-bottom direction showing a locking plate according to an exemplary embodiment of the present invention;

FIG. 9A and FIG. 9B are respectively a top view and a back view showing a serration plate according to an exemplary embodiment of the present invention;

FIG. 10 is a schematic view which illustrates a first circumstance in which a static discharger according to an exemplary embodiment of the present invention is installed on a trailing edge profile member of a rudder and/or an elevator of an airplane;

FIG. 11 is a schematic view which illustrates a second circumstance in which a static discharger according to an exemplary embodiment of the present invention is installed on a trailing edge profile member of a rudder and/or an elevator of an airplane;

FIG. 12A and FIG. 12B are respectively a schematic view illustrating an electrical conductivity route of a static discharger according to an exemplary embodiment of the present invention.

DETAILED DESCRIPTION

Hereinafter, the present invention will be described in detail with reference to the drawings and in conjunction with the exemplary embodiments. The following detailed description is for illustration purpose only but is not intended to limit the present invention and its application or usage.

Figure 2:
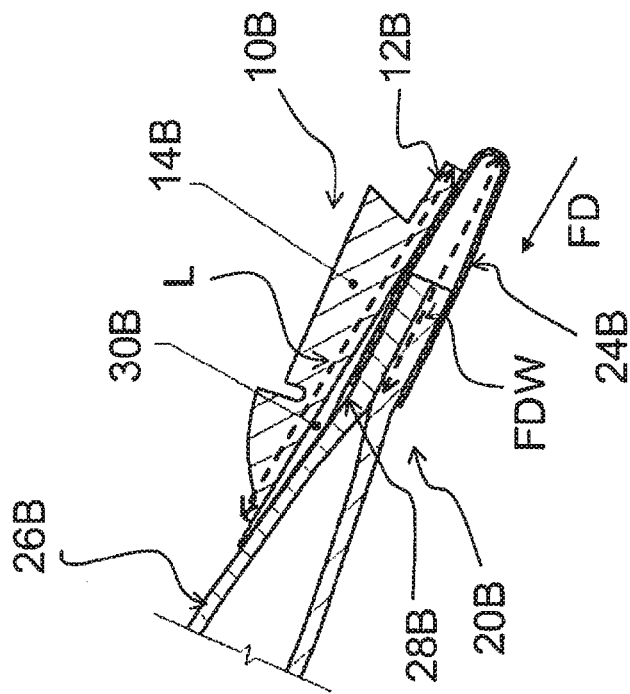
FIG. 2 is a schematic view which illustrates a situation where another static discharger according to the relevant technology is installed on an elevator of an airplane.
Figure 1:
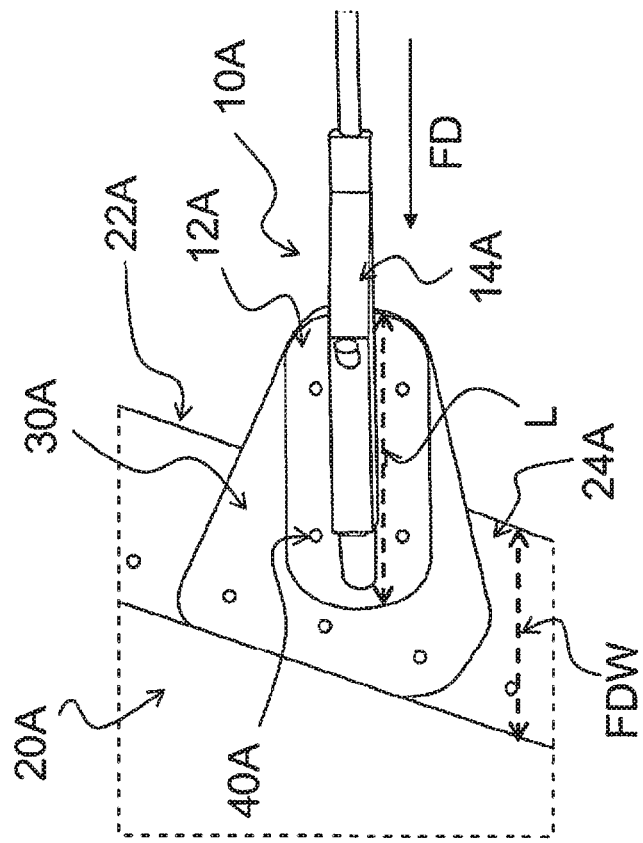
FIG. 1 is a schematic view for illustrating a situation where a static discharger according to the relevant technology is installed on a rudder of an airplane.
Figure 3:
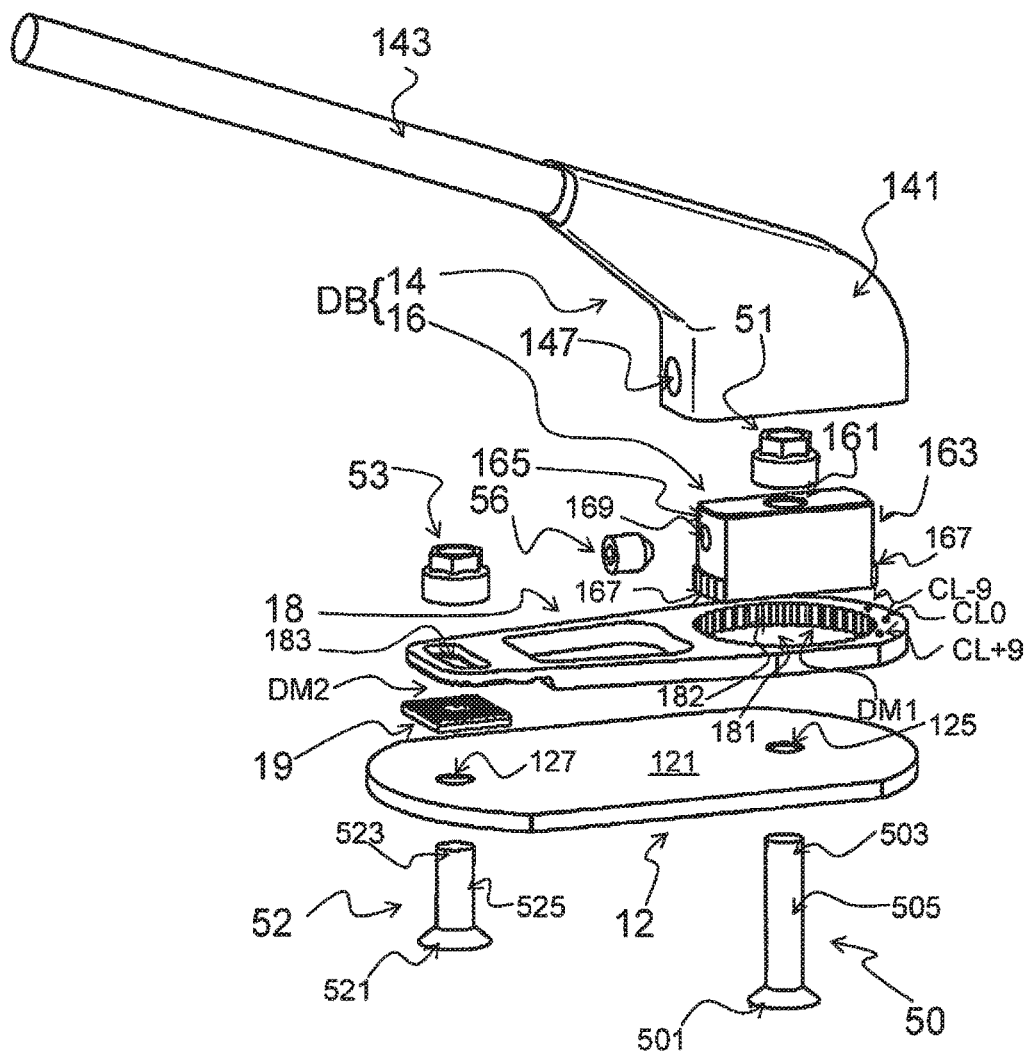
FIG. 3 is an exploded perspective view showing a static discharger according to an exemplary embodiment of the present invention.

Firstly, a static discharger 10 according to an exemplary embodiment of the present invention is described with reference to FIG. 3 and FIG. 4. FIG. 3 is an exploded perspective view showing a static discharger according to an exemplary embodiment of the present invention, and FIG. 4 is a longitudinal section view showing a static discharger according to an exemplary embodiment of the present invention.

As shown FIG. 3, the static discharger 10 may include a basement discharging portion 14, an internal-media 16, a locking plate 18 (serving as an intermediate body according to the present invention) and a serration plate 19. It is to be noted herein that the assembly of the discharging portion 14 and the internal-media corresponds to a discharger body DB according to the present invention.

The basement 12 may be a substantially rectangular shape plate (such as a rectangular plate with rounded corners), and is adapted to be installed (via a lower surface 123 thereof), for example, on a trailing edge profile member 24 (referring to FIG. 4) of a rudder and/or an elevator of an airplane. The flat plate configuration of the basement 12 can facilitate stable installation and sufficient electrical contact of the static discharger 10. Here, it is to be noted that the trailing edge profile member 24 serves as a supporting and conductive structure according to the present invention.

A first through hole 125 and a second through hole 127 are formed in a front region (the right region in FIG. 3) and a rear region (the left region in FIG. 3) of the basement 12, respectively. A first bolt 50 (acting as a first shaft member according to the present invention) and a second bolt 52 (acting as a second shaft member according to the present invention) are adapted to pass through the first through hole 125 and the second through hole 127, respectively.

The first bolt 50 and the second bolt 52 may employ countersunk bolts such that ahead portion 501 of the first bolt 50 and ahead portion 521 of the second bolt 52 can be respectively received in the first through hole 125 and the second through hole 127 in an assemble state of the static discharger 10. Therefore, it is ensured that the basement 12 can be installed on the trailing edge profile member 24 in a fit manner, which is helpful to stable installation and sufficient electrical contact of the static discharger 10.

In some examples, the first bolt 50 and the second bolt 52 may be provided with (outer) threads only at distal ends 503, 523 (the upper ends in FIG. 3) thereof with middle portions 505, 525 of the bolts between the head portions and the end portions having no (outer) threads. The middle portion 505 of the first bolt 50 is configured to be inserted in a through hole 161 of the internal-media 16 which will be described hereinafter, and the middle portion 525 of the second bolt 52 is configured to be inserted in a through hole (also referred to as an orifice) 191 of the serration plate 19 and a slot 183 of the locking plate 18 which will be described hereinafter. Therefore, the middle portions 505 and 525 without any thread thereon facilitate smooth rotations of the internal-media 16 and the serration plate 19/the locking plate 18 around the middle portions 505 and 525. Therefore the installation orientations of the internal-media 16 and then the discharging portion 14 (that is, the whole discharger body DB) with respect to the basement can be adjusted conveniently. In other examples, the first bolt 50 and the second bolt 52 may be provided with threads at all regions other than the head portions 501 and 521 thereof.

A first nut 51 may be connected with the end portion 501 of the first bolt 50 in a thread connection manner, and a second nut 53 may be connected with the end portion 521 of the second bolt 52 in a thread connection manner, such that the internal-media 16, the locking plate 18 and the serration plate 19 can be fastened to the basement 12 after the installation orientations of the internal-media 16 and the locking plate 18 with respect to the basement 12 are properly adjusted. Herein, it is to be noted that a first fixing mechanism PM1 according to the present invention may include the first bolt 50, the first nut 51, the second bolt 52 and the second nut 53.

Figure 5:
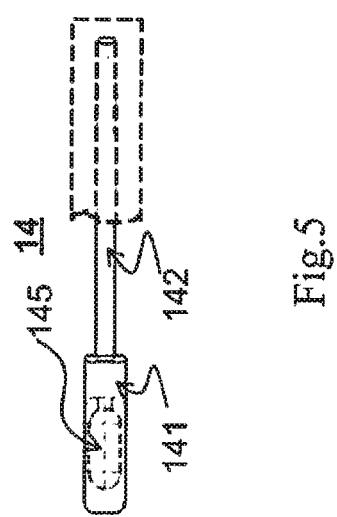
FIG. 5 is bottom view showing a discharging portion according to an exemplary embodiment of the present invention.

The discharging portion 14 may include a connection portion 141 and a tail portion 143. A receiving groove 145 (referring to FIG. 4 and FIG. 5, in which FIG. 5 is bottom view showing a discharging portion according to an exemplary embodiment of the present invention) is formed in a bottom portion of the connection portion 141. The receiving groove 145 is of a substantially cuboid profile (for example, the two sides of the receiving groove 145 in the transverse direction is of a flat shape while the two sides in the longitudinal direction is of a circular arc shape), and is adapted to receiving the internal-media 16.

As shown in FIG. 4, a nut receiving groove 146 in communication with the receiving groove 145 may also be formed in the connection portion 141. The nut receiving groove 146 is used to receive the first nut 51 thread-connected with the first bolt 50.

Figures 6A, 6B:
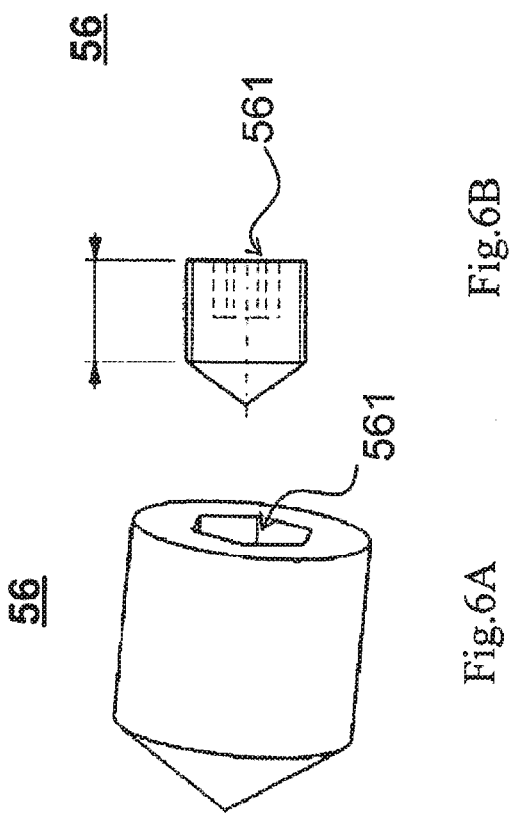
FIG. 6A and FIG. 6B are respectively a perspective view and a side view showing an anchoring member according to an exemplary embodiment of the present invention.

An anchoring hole 147 (with or without threads) in communication with the receiving groove 145 is formed in a rear portion of the connection portion 141 (the right portion in FIG. 4 and corresponding to a leeward portion according to the present invention). An anchoring member 56, such as a self-locking screw, may pass through the anchoring hole 147, such that a front end of the anchoring member 56 is inserted in a recess 169 at a rear portion of the internal-media 16 to thereby fasten the discharging portion 14 to the internal-media 16 and then to the basement 12. Referring to FIG. 6A and FIG. 6B (FIG. 6A and FIG. 6B are respectively a perspective view and a side view showing an anchoring member according to an exemplary embodiment of the present invention), a driving hole 561 may be formed in a rear portion of the anchoring member 56. The driving hole 561 is adapted to receive driving tools such as a screwing tool such that the anchoring member 56 is, for example, screwed into the recess at the rear portion of the internal-media 16.

In some examples, a front side (the right side in FIG. 3, that is, the windward side) of the discharging portion 14 which includes the connection portion 141 and the tail portion 143 has a streamline profile in accordance with the aerodynamic characteristics.

The internal-media 16 may have a substantially cuboid profile (for example, the two sides of the internal-media 16 in the transverse direction is of a flat shape while the two sides in the longitudinal direction is of a circular arc shape), and is adapted to be fittingly (in a shape-matched manner) received in the receiving groove 145 of the discharging portion 14. Therefore, when the discharging portion 14 is placed on the internal-media 16, because of non-circular or polyhedral profile matching between the internal-media 16 and the receiving groove 145, the rotation (the movement in the circumferential direction) and the radial movement of the discharging portion 14 with respect to the internal-media 16 can be reliably restrained.

A through hole 161 is formed at a substantially central position, in the longitudinal and transverse directions, of the internal-media 16 (reference may also be made to FIG. 7A to FIG. 7C—FIG. 7A to FIG. 7C are respectively a side view, a bottom view and a perspective view showing an internal-media according to an exemplary embodiment of the present invention). The through hole 161 is adapted to receiving (in a matching manner) the first bolt 50 (in particular, the middle portion 505 of the first bolt 50), to allow and guide the internal-media 16 to rotate (for example, a 360 degree rotation) about the first bolt 50 and with respect to the basement 12 and the locking plate 18, or to allow and guide the internal-media 16 together with the locking plate 18 to rotate about the first bolt 50 and with respect to the basement 12, during the installation of the static discharger 10 on site. Herein, it is noted that an installation orientation adjusting mechanism OA according to the present invention may include the first bolt 50 and the through hole 161 (serving as a shaft hole according to the present invention) of the internal-media 16.

Lower portions of a front side 163 and a rear side 165 of the internal-media 16 in a longitudinal direction thereof are formed with one or more positioning teeth 167 (outer teeth/serving as a first positioning tooth according to the present invention) distributed in a circumstantial direction, respectively. In some examples, a tooth pitch of the positioning teeth 167 is a standard pitch corresponding to a 9-degree circular arc.

A recess 169 (for example, a conical recess 169) is formed at a center position of a rear portion (corresponding to the leeward portion according to the present invention) of the internal-media 16. The front end of the above mentioned anchoring member 56 may be inserted in the recess 169, to fasten the discharging portion 14 to the internal-media 16 and thus to the basement 12. The recess 169 is adapted to guide, for example, the self-tapping insertion of the anchoring member 56 such as a self-locking screw to thereby facilitate fastening the discharging portion 14 to the internal-media 16 via the anchoring member 56. Besides, the fixing structure of the discharging portion 14 and the internal-media 16 is provided at the leeward side of the static discharger 10, which thereby can sustain the intact streamline profile of the windward side of the static discharger 10 to ensure that the leeward side of the static discharger 10 is in accordance with the aerodynamic characteristics. In some examples, a taper angle of the conical recess 169 may be 100 degrees or around 100 degrees (reference may particularly be made to FIG. 4 and FIG. 7A). Herein, it should be noted that a second fixing mechanism PM2 may include the anchoring member 56, the anchoring hole 147 and the recess 169.

A front portion (the left potion as shown in FIG. 8A and FIG. 8B—FIG. 8A and FIG. 8B are respectively a bottom view and a perspective view viewed from a side-bottom direction showing a locking plate according to an exemplary embodiment of the present invention) of the locking plate 18 in a longitudinal direction thereof may be provided with a circular hole 181. The circular hole 181 is adapted to receive the internal-media 16 (for example, receive a portion, that is, the bottom portion, of the internal-media 16) in a matching manner. In other words, an inner diameter of the circular hole 181 is in accordance with a diameter of an imaginary circle of the internal-media 16, such that when the internal-media 16 is received in the circular hole 181, the circular hole 181 can restrict the radial movement of the internal-media 16.

A center of the circular hole 181 of the locking plate 18, a center of the through hole 161 of the internal-media 16, a center line of the first bolt 50 and a center of the first through hole 125 of the basement 12 may coincide with each other, and herein a first axis C1 denotes their coincidence position (shown in FIG. 4).

The circular hole 181 may be formed with a positioning tooth 182 (inner tooth/serving as a second positioning tooth according to the present invention). In some examples, there may be forty positioning teeth 182, and a tooth pitch of the positioning teeth 182 is also a standard pitch corresponding to a 9-degree circular arc. In other words, when the internal-media 16 is rotated, with respect to the locking plate 18, in such a way that one positioning tooth of the internal-media 16 is moved from one tooth space between two positioning teeth of the circular hole 181 of the locking plate 18 to another tooth space next to the one tooth space, the internal-media 16 is exactly rotated at 9 degrees. Herein, since both the positioning teeth 167 and the positioning teeth 182 employ a standard pitch, it is convenient to machine the component parts and the manufacturing costs can be reduced.

A rear portion (the right portions of FIG. 8A and FIG. 8B) of the locking plate 18 in the longitudinal direction thereof may be formed with a slot 183. The slot 183 may be a long circular arc slot with the first axis C1 as an arc center. The second bolt 52 may be inserted in the slot 183. In this way, during the installation course on the scene, the locking plate 18 together with the internal-media 16 can be rotated around the first bolt 50 at a certain angle in a condition that the slot 183 moves (passes) by the second bolt 52 (in a condition that the tooth pitch of the positioning teeth 167 and the positioning teeth 182 corresponds to a 9-degree arc, a length of the slot 183 in a circumferential direction thereof may be configured in a way that a degree of the circular arc corresponding to the slot 183 is larger than or equal to 9 degrees, that is, the said certain angle is larger than or equal to 9 degrees). Herein, it is noted that, the installation orientation adjusting mechanism OA according to the present invention may further include the second bolt 52 and the slot 183 of the locking plate 18.

In the exemplary embodiments herein, the dual functions of the first bolt 50 and the second bolt 52 (that is, they may constitute a part of the first fixing mechanism PM1 as well as a part of the installation orientation adjusting mechanism OA) facilitate simplifying the structure and assembly of the static discharger 10 and reduce the corresponding costs.

Specially, referring to FIG. 8A and FIG. 8B, a lower surface of the rear portion of the locking plate 18 in the longitudinal direction thereof may be provided with one or more positioning serrations 185 (for example, parallel serrations/serving as a first fine adjustment positioning tooth according to the present invention). The lower surface, formed with the positioning serration 185, of the rear portion of the locking plate 18 may be upwardly concaved (referring to FIG. 3 and FIG. 4) to receive the serration plate 19 in a matching manner. Therefore, the assembled locking plate 18 and serration plate 19 as a whole still can present a substantially flat plate configuration, which facilitates stable installation and sufficient electrical contact of the static discharger 10.

There may be a predetermined position relationship between the locking plate 18 and the basement 12. For example, during the assembly course of the static discharger 10, the locking plate 18 may be arranged with respect to the basement 12 (temporarily) in such a way that the longitudinal direction of the locking plate 18 is in line with that of the basement 12. In some examples, alignment marks may be provided at a longitudinal end of the locking plate 18 and a longitudinal end of the basement 12, such that the (temporary) alignment between the locking plate 18 and the basement 12 can be easily identified during the assembly course of the static discharger 10.

The serration plate 19 may be provided with a through hole 191 (reference may also be made to FIG. 9A and FIG. 9B—FIG. 9A and FIG. 9B are respectively a top view and a back view showing a serration plate according to air exemplary embodiment of the present invention). The through hole 191 is adapted to receive (in a matching manner) the second bolt 52 (in particular, the middle portion 525 of the second bolt 52), such that the serration plate 19 may be allowed to rotate around the second bolt 52 (that is, the center line of the second bolt 52, which is denoted by a second axis C2 herein—as shown in FIG. 4) during the installation of the static discharger 10 on site.

An upper surface of the serration plate 19 may be provided with a positioning serration 193 (for example, parallel serrations/serving as a second fine adjustment positioning tooth according to the present invention). The positioning serration 193 of the serration plate 19 is adapted to mesh with the positioning serration 185 of the locking plate 18. Tooth pitches of the positioning serrations 185 and the positioning serrations 193 are configured in such a way that: when the locking plate 18 together with the internal-media 16 are rotated around the first bolt 50, in a condition that the slot 183 moves by the second bolt 52, so that one positioning serration of the locking plate 18 is moved from one tooth space between two positioning serrations of the serration plate 19 to another tooth space next to the one tooth space, the locking plate 18 together with the internal-media 16 are exactly rotated at 1 degree.

It is noted herein that a degree of the circular arc corresponding to the tooth pitch of the positioning teeth 167 and the positioning teeth 182 may be various, and a degree of the circular arc corresponding to the tooth pitch of the positioning serrations 185 and the positioning serrations 193 may also be various. For example, the degree of the circular arc corresponding to the tooth pitch of the positioning teeth 167 and the positioning teeth 182 may be 4 degrees, 5 degrees, 6 degrees, 7 degrees, 8 degrees, 9 degrees, 10 degrees, 11 degrees, 12 degrees, 13 degrees, or 14 degrees, and the degree of the circular arc corresponding to the tooth pitch of the positioning serrations 185 and the positioning serrations 193 may be 0.5 degree, 0.75 degree, 1 degree, 1.25 degrees, or 1.5 degrees.

In some examples, scales may be marked on the locking plate 18 (for example, on the upper surface) at a position adjacent to the positioning tooth 182 of the circular hole 181, such that an installation operator can identify an angle corresponding to each of the tooth spaces between the positioning teeth 182. For example, as shown in FIG. 3, a scale CL0 corresponding to a tooth space at the very front side may be denoted as 0 degree, a scale CL+9 corresponding to a tooth space next to the tooth space at the very front side on a clockwise side may be denoted as +9 degrees, a scale CL−9 corresponding to a tooth space next to the tooth space at the very front side on a counterclockwise side may be denoted as −9 degrees, and so on. Therefore, when the internal-media 16 is positioned with respect to the locking plate 18 in such a way that a positioning teeth 167a (referring to FIG. 7C) at the very front side of the internal-media 16 is placed in the tooth space at the very front side, the installation orientation of the internal-media 16 with respect to the locking plate 18 and then to the basement 12 is 0 degree (in a condition that a second indexing mechanism to be described in the following is at the 0-degree position). At this time, longitudinal directions of the internal-media 16 and then the discharging portion 14 are in line with those of the locking plate 18 and then the basement 12, and front sides of the internal-media 16 and then the discharging portion 14 align with those of the locking plate 18 and then the basement 12.

In some examples, scales may be marked on the serration plate 19 (for example, on a rear end surface) at a position adjacent to the positioning serration 193, such that an installation operator can identify an angle corresponding to each of the tooth spaces between the positioning serrations 193. For example, as shown in FIG. 9B, a scale cl0 corresponding to a central tooth space which is align with the center of the through hole 191 of the serration plate in the longitudinal direction may be denoted as 0 degree, a scale cl+1 corresponding to a tooth space next to the central tooth space on the clockwise side may be denoted as +1 degree, a scale cl−1 corresponding to a tooth space next to the central tooth space on the counterclockwise side may be denoted as −1 degree, and so on. Therefore, in a case that the first indexing mechanism to be described hereinafter is at the 0-degree position, when the locking plate 18 is positioned with respect to the serration plate 19 in such a way that a central positioning serration 185a (referring to FIG. 8A and FIG. 8B) of the locking plate 18 is placed in the central tooth space, the installation orientation of the locking plate 18 with respect to the serration plate 19 and then to the basement 12 is 0 degree. At this time, the longitudinal direction of the locking plate 18 is in line with that of the serration plate 19 and then that of the basement 12.

It is noted herein that the first indexing mechanism (the first level indexing mechanism) DM1 according to the present invention may include: the positioning tooth 182 at the circular hole 181 of the locking plate 18, and the positioning teeth 167 at the lower portions of the front side 163 and the rear side 165 of the internal-media 16, and the second indexing mechanism (second level indexing mechanism) DM2 according to the present invention may include: the positioning serration 185 at the lower surface of the rear portion of the locking plate 18, and the positioning serration 193 at the upper surface of the serration plate 19. The arrangement of the double-level indexing mechanism can facilitate convenient and accurate adjustment and determination of the rotation angle of the discharger body DB with respect to the basement 12 and then to the rudder/elevator.

Hereinafter, an exemplary assembly course of the static discharger 10 according to the exemplary embodiment of the present invention and an exemplary installation course in which the static discharger 10 is installed, for example, on the trailing edge profile member 24 of the rudder and/or the elevator will be described.

According to the exemplary embodiment of the present invention, when the static discharger 10 is taken away from the factory, the basement 12 and the discharging portion 14 (the discharge body DB) of the static discharger 10 are not fixedly assembled or integrally formed with each other, but is provided in an unassembled state as shown in FIG. 3. On the installation site, the assembly/installation manner of the basement 12 and then the whole static discharger 10 will be determined based on circumstances such as dimension and orientation of the trailing edge profile member 24 of the rudder and/or the elevator of the airplane.

In a case that a width W of the trailing edge profile member 24 is larger than or (substantially) equal to a length L of the basement 12 (as shown in FIG. 10—FIG. 10 is a schematic view which illustrates a first circumstance in which a static discharger according to an exemplary embodiment of the present invention is installed on a trailing edge profile member of a rudder and/or an elevator of an airplane), the basement 12 may be installed on the trailing edge profile member 24 in a way that a longitudinal direction LD of the basement 12 is in line with a width direction WD of the trailing edge profile member 24. In a case that the width W of the trailing edge profile member 24 is smaller that the length L of the basement 12 (as shown in FIG. 11—FIG. 11 is a schematic view which illustrates a second circumstance in which a static discharger according to an exemplary embodiment of the present invention is installed on a trailing edge profile member of a rudder and/or an elevator of an airplane), the basement 12 may be installed on the trailing edge profile member 24 in a way that the longitudinal direction LD of the basement 12 intersects with or even is perpendicular to the width direction WD of the trailing edge profile member 24, such that the basement 12 can be completely superposed on the (flat) trailing edge profile member 24 to thereby avoid the so called (partially) suspended installation manner or bestriding installation manner.

After a suitable installation manner of the basement 12 with respect to the trailing edge profile member 24 is determined, suitable installation orientations of the internal-media 16 and then of the discharging portion 14 with respect to the basement 12 are determined. It is noted herein that since the rotation of the discharging portion 14 with respect to the internal-media 16 is restricted, an installation orientation of the discharging portion 14 with respect to the basement 12 corresponds to that of the internal-media 16 with respect to the basement 12.

Herein, the circumstance as shown in FIG. 11 where the width W of the trailing edge profile member 24 is smaller than the length L of the basement 12 and the basement 12 is installed in such a way that the longitudinal direction LD of the basement 12 intersects with the width direction WD of the trailing edge profile member 24 is described as an example. As shown in FIG. 11, in order that the discharger body DB (the discharging portion 14) is installed to be in line with the flight direction (movement direction) FD, it is required that the discharger body DB is positioned in such a way that the discharger body DB is turned at 75 degrees in the clockwise direction from a position (referred to as an original position OP) in which the discharger body DB aligns with the longitudinal direction LD of the basement 12 to a new flight alignment position FA as shown in FIG. 11.

After an installation orientation of the discharger body DB with respect to the basement 12 is determined (being turned at 75 degrees in the clockwise direction as shown in FIG. 11), the assembly course of the static discharger 10 and the installation course for installing the static discharger 10 on the trailing edge profile member 24 can begin.

Firstly, the first bolt 50 is passed through the first through hole 125 of the basement 12, the circular hole 181 of the locking plate 18 and the through hole 161 of the internal-media 16 in sequence, and the second bolt 52 is passed through the second through hole 127 of the basement 12, the through hole 191 of the serration plate 19 and the slot 183 of the locking plate 18 in order. At this time, the first nut 51 and the second nut 53 are not yet screwed on the first bolt 50 and the second bolt 52, or the first nut 51 and the second nut 53 are screwed on the first bolt 50 and the second bolt 52 but are not tightened yet, in this case, the internal-media 16 itself or the internal-media 16 together with the locking plate 18 can still rotate around the first bolt 50 (that is, the first axis C1) and the serration 19 still can rotate about the second bolt 52 (that is, the second axis C2).

Then, the internal-media 16 is rotated with respect to the locking plate 18 (at this time, the locking plate 18 can be aligned with the basement 12 in the longitudinal direction) in the clockwise direction, such that the locking tooth 167a at the very front side of the internal-media 16 aligns in an axial direction with a tooth space (that is, the tooth space that is eight tooth spaces away from the tooth space at the very front side on the clockwise side), denoting the +72-degree, of the tooth spaces between the positioning teeth 182 of the circular hole 181. Then, the internal-media 16 is inserted in the circular hole 181 in the axial direction. At this time, an angle of the internal-media 16 with respect to the locking plate 18 and then to the basement 12 is 72 degrees in the clockwise direction.

Next, the locking plate 18 and the internal-media 16 assembled together are rotated about the first bolt 50 in the clockwise direction, meanwhile, the serration plate 19 is rotated about the second bolt 52 in the clockwise direction accordingly, such that the central positioning serration 185a of the locking plate 18 is placed in a tooth space (that is, the tooth space which is three tooth spaces away from the central tooth space on the clockwise side) of the serration plate 19 which denotes the +3 degrees. At this time, the angle of the locking plate 18 with respect to the basement 12 is 3 degrees in the clockwise direction, but the angle of the internal-media 16 with respect to the basement 12 is 75 degrees in the counter clockwise (that is, 72 degrees plus 3 degrees).

Next, the first nut 51 is screwed to the distal threaded end 503 of the first bolt 50, and the second nut 53 is screwed to the distal threaded end 523 of the second bolt 52, to thereby fasten the internal-media 16, the locking plate 18, the serration plate 19 and the basement 12 together.

Next, the basement 12 together with the internal-media 16, the locking plate 18 and the serration plate 19 are installed to, for example, the trailing edge profile member 24 of the rudder and/or the elevator of the airplane based on the determined installation orientation of the basement 12 with respect to the trailing edge profile member 24. In some examples, the basement 12 is fixedly connected to the trailing edge profile member 24 via fasteners 40 such as a countersunk bolt as shown in FIG. 10.

Then, the discharging portion 14 is arranged on the internal-media 16 such that the internal-media 16 is received in the receiving groove 145 of the discharging portion 14. And then, the anchoring member 56, such as a self-locking screw, is passed through the anchoring hole 147 and then inserted in the recess 169 at the rear portion of the internal-media 16, to thereby fasten the discharging portion 14 to the internal-media 16, to the basement 12 and then to the trailing edge profile member 24.

As such, the assembly/installation course of the static discharger 10 is completed.

Hereinafter, an electrical conductivity route of a static discharger according to an exemplary embodiment of the present invention will be described with reference to FIG. 12A and FIG. 12B (FIG. 12A and FIG. 12B are respectively a schematic view illustrating an electrical conductivity route of a static discharger according to an exemplary embodiment of the present invention).

In the static discharger 10, there may be a plurality of electrical conductivity routes, which therefore can ensure an efficient static discharging. For example, the electrical conductivity routes may include a first route, a second route, a third route, a fourth route, a fifth route and a sixth route. The first route is: a conductive point a at a top wall of the receiving groove 145 of the discharging portion 14—a conductive point e at a top surface of the internal-media 16—a conductivity point d at a bottom surface of the internal-media 16—a conductive point x at the upper surface 121 of the basement 12—a conductive point y at the lower surface 123 of the basement 12—a conductive point z at the trailing edge profile member 24. The second route is: a conductive point b at a front/rear side of the receiving groove 145 of the discharging portion 14—a conductive point g at a front/rear side of the internal-media 16—the conductive point d at the bottom surface of the internal-media 16—the conductive point x at the upper surface 121 of the basement 12—the conductive point y at the lower surface 123 of the basement 12—the conductive point z at the trailing edge profile member 24. The third route is: a conductive point c at a side wall of the receiving groove 145 of the discharging portion 14—a conductive point f at a side surface of the internal-media 16—the conductive point d at the bottom surface of the internal-media 16—the conductive point x at the upper surface 121 of the basement 12—the conductive point y at the lower surface 123 of the basement 12—the conductive point z at the trailing edge profile member 24. The fourth route, the fifth route and the sixth route are formed by replacing the sub-electrical conductivity route of the conductivity point d at the bottom surface of the internal-media 16" in the first route, the second route and the third route with a sub-electrical conductivity route of "a conductive point h at the positioning tooth 167 of the internal-media 16—a conductive point i at the positioning tooth 182 of the circular hole 181 of the locking plate 18—a conductive point j at the positioning serration 185 of the locking plate 18—a conductive point k at the positioning serration 193 of the serration plate 19—a conductive point l at a lower surface of the serration plate 19", respectively.

According to the exemplary embodiment of the present invention, when the static discharger is taken away from the factory, the basement and the discharging portion (the discharger body) are not fixedly assembled or integrally formed with each other. Therefore, the assembly/installation manner of the basement and then the whole static discharger can be determined on the installation site based on circumstances such as dimension and orientation of the trailing edge profile member of the rudder and/or the elevator of the airplane, such that the basement and then the whole static discharger can be flexibly adapted to, for example, the relatively narrow trailing edge profile member of the rudder and/or the elevator. And in particular, the angle of the discharging portion (the discharger body) with respect to the basement and to the trailing edge profile member can be flexibly adjusted based on the practical circumstance on the installation site. Therefore, it is easy to ensure that the discharging portion (the discharger body) is installed in line with the flight direction. Thus, the universality of the static discharger is increased, and there is no need to prepare a series of different static dischargers for different models of airplane and installation positions etc.

In addition, according to the exemplary embodiment of the present invention, since no additional installation member such as a metallic plate is needed in the installation of the static discharger, disadvantageous circumstances such as that the weight is increased, the assembly is complex and the aerodynamic surface is affected can be avoided. Besides, the so called suspended installation manner or bestriding installation manner can be avoided since generally the basement can be completely superposed on the flat trailing edge profile member, thus the electrical contact can be improved, the installation course can be further piffled and the affection on the aerodynamic surface can be further reduced.

It should be noted herein that according to the exemplary embodiment of the present invention, even though in a certain circumstance that the basement cannot be completely superposed on the trailing edge profile member by adjusting an installation orientation of the basement with respect to the trailing edge profile member, and the employment of the so called suspended installation manner or bestriding installation manner with or without an additional metallic plate cannot be avoided, since the suspended region/bestriding, region can be properly reduced and then the additional metallic plate (in case that an additional metallic plate is employed) can be properly reduced, acceptable effects which are basically the same as or similar to the above advantageous technical effects can be obtained. In particular, even though in a certain circumstance that it is necessary to employ the so called suspended installation manner or bestriding installation manner with an additional metallic plate being used, the angle of the discharging portion with respect to the basement and to the trailing edge profile member can be flexibly adjusted based on the practical circumstance on the installation site, and thus it is easy to ensure that the discharging portion is installed in line with the flight direction.

In addition and in particular, since indexing mechanisms (the first level indexing mechanism and the second level indexing mechanism) are provided and accordingly scales are provided thereon, and since at the same time the indexing mechanisms also play positioning roles through meshing of the teeth, angles of the discharging portion (discharger body) with respect to the basement and the rudder/elevator (trailing edge profile member) can be adjusted and determined (identified) conveniently and accurately, and the discharging portion (discharger body) can be positioned with respect to the basement and the rudder/elevator (trailing edge profile member) based on the determined angle, therefore it can further ensure that the discharging portion (discharger body) is installed in line with the flight direction.

The static discharger according to the present invention may allow for many different variants.

In the above exemplary embodiment, the discharger body DB includes the discharging portion 14 and the internal-media 16. However, alternatively, the discharger body DB may be made into one piece. In this variant, the discharger body DB may be formed therein with a through hole passing through the discharger body in the up-down direction, and a lower portion of the discharger body DB may be configured to be able to achieve an indexing function. In addition, in this variant, the second fixing mechanism PM2 may be omitted.

In the above exemplary embodiment, the first bolt 50 and the second bolt 52 are formed separately from the basement 12, and pass through the through holes 125 and 127 of the basement 12. However, alternatively, the first bolt 50 and/or the second bolt 52 may be integrally formed or fixedly connected with the basement 12. The first bolt and/or the second bolt which are integrally formed can facilitate installation convenience and stability.

In the above exemplary embodiment, the first indexing mechanism includes an inner positioning tooth 182 at the circular hole 181 of the locking plate 18 and outer positioning teeth 167 at the lower portions of the front side 163 and the rear side 165 of the internal-media 16. However, alternatively, an internal positioning tooth may be provided at the discharger body DB for example at the internal-media 16 (by forming a circular groove), and an outer positioning tooth may be formed at the basement 12 or the locking plate 18 (by forming a circular convex portion adapted to be received in the circular groove).

In the above exemplary embodiment, the locking plate 18 and the basement 12 are formed separately. However, alternatively, in a case that there is no need for a second level indexing function, the locking plate 18 and the basement 12 may be integrally formed or be fixedly connected.

In the above exemplary embodiment, a locking plate 18 is provided. However, alternatively, the locking plate 18 may be omitted in a case that there is no need for a second level indexing function. In this case, a circular hole may be directly formed on the basement 12.

In the above exemplary embodiment, a first indexing mechanism (first level indexing mechanism) DM1 and a second indexing mechanism (second level indexing mechanism) DM2 are provided. However, in an alternative modified solution, the second level indexing mechanism DM2 may be omitted, or both the first level indexing mechanism DM1 and the second level indexing mechanism DM2 may be omitted. In this case, the installation orientation of the discharger body DB with respect to the basement 12 can still be flexibly adjusted on the installation site, and then other suitable identification measures may be employed to determine whether the discharger body is installed to be in line with the flight direction.

In the above exemplary embodiment, the first fixing mechanism PM1 and the second fixing mechanism PM2 are configured as thread-connected mechanisms. However, it can be conceived that in a modified solution, other suitable means may be employed to achieve the first fixing mechanism and the second fixing mechanism, for example, welding and adhering.

In the above exemplary embodiment, the installation orientation adjusting mechanism OA may include the first bolt 50 and the through hole 161 of the internal-media 16, and may further include the second bolt 52 and the slot 183 of the locking plate 18. However, alternatively, in a case that there is no need for an indexing function, the installation orientation adjustment function may be achieved by rotating the internal-media (without a positioning tooth) in a circular hole (without a positioning tooth) directly formed on the basement, or rotating the internal-media (without a positioning tooth) in a circular hole (without a positioning tooth) formed on the locking plate which in turn, for example, is fixedly connected to the basement. Still alternatively, in a case that an indexing function is required, the internal-media (with a positioning tooth), after being rotated, may be arranged in a circular hole (with a positioning tooth) directly formed on the basement, or the internal-media (with a positioning tooth), after being rotated, may be arranged in a circular hole (with a positioning tooth) formed on the locking plate which in turn, for example, is fixedly connected to the basement. Therefore, the installation orientation function as well as the indexing function can also be achieved.

In the above exemplary embodiment, the internal-media 16 has a substantially cuboid profile. However, other suitable profiles may be conceived, for example, a bottom portion of the internal-media 16 is a circular disk with a positioning tooth being provided on the whole outer periphery thereof, and a middle-upper portion of the internal-media is still of a substantially cuboid profile.

In the above exemplary embodiment, the serration plate 19 is provided to achieve the second level indexing function. However, the serration plate may be omitted. For example, outer teeth (parallel teeth) may be provided at an outer periphery of a rear portion (a fine adjustment portion or a second level indexing portion) of the locking plate 18, an arc convex portion protruding upwardly from an upper surface of the basement 12 may be provided in the basement 12, and inner teeth (parallel teeth) meshing with the outer teeth of the locking plate 18 may be provided at an inner periphery of the arc convex portion. Again, for example, positioning teeth (for example, in a radial form and distributed in an arc manner) may be provided on a lower surface of a rear portion of the locking plate 18, and positioning teeth (for example, in a radial form and distributed in an arc manner) meshing with the positioning teeth of the above locking plate 18 may be provided on an upper surface of the basement 12.

In the above exemplary embodiment, it is described that the static dischargers is applied to the airplane. However, the static discharger according to the present invention may also be applied to other aircrafts or even high-speed moving bodies such as a train or an automobile. It should be noted that, high-speed moving bodies such as the airplane, the aerospace plane, the train and the automobile serve as a moving body according to the present invention.

Figure 13:
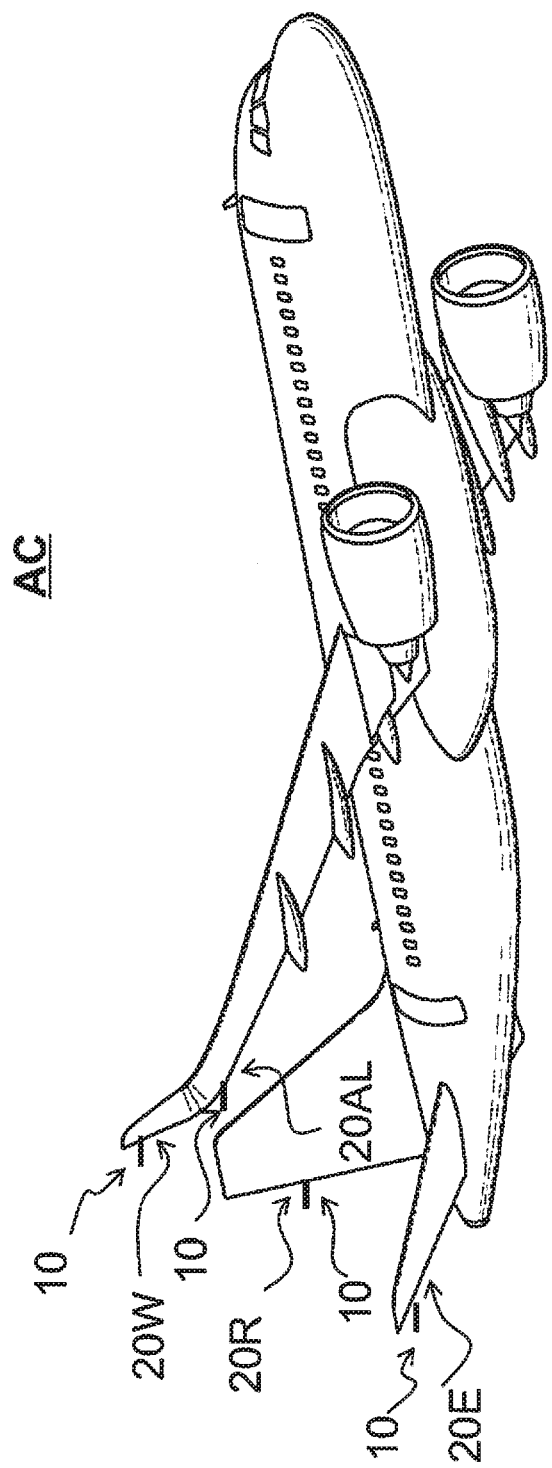
FIG. 13 is a schematic view s n aircraft according to the present invention.

In the present invention, an aircraft AC (referring to FIG. 13—FIG. 13 is a schematic view showing an aircraft according to the present invention) including the above mentioned static discharger 10 is further provided. In the aircraft AC, the static discharger 10 may be provided at a trailing edge (for example, a trailing edge profile member 24) of an elevator 20E, a trailing edge (for example, a trailing edge profile member 24) of a rudder 20R, a trailing edge (for example, a trailing edge profile member 24) of an aileron 20AL of the wing, or a trailing edge (for example, a trailing edge profile member 24) of a winglet 20W of the wing.

It is further provided according to the present invention a process for installing the above static discharger 10 to a supporting and conductive structure (for example, a trailing edge profile member 24) of the moving body (for example, the airplane).

To sum up, the present invention may include the following advantageous solutions.

In the static discharger according to the present invention, an indexing mechanism adapted to adjust a magnitude of a rotation angle of the discharger body with respect to the basement in an indexing manner is further included.

In the static discharger according to the present invention, the indexing mechanism comprises a first indexing mechanism adapted to roughly adjust the magnitude of the rotation angle, and the first indexing mechanism comprises: a first positioning tooth provided at the discharger body and distributed in a circumferential direction; and a second positioning tooth provided at the basement or at an intermediate body, adapted to mesh with the first positioning tooth and distributed in a circumferential direction, the intermediate body being arranged between the basement and the discharger body.

In the static discharger according to the present invention, the second positioning tooth is provided at the intermediate body, the indexing mechanism further comprises a second indexing mechanism adapted to finely adjust the magnitude of the rotation angle, and the second indexing mechanism comprises: a first fine adjustment positioning tooth provided at the intermediate body; and a second fine adjustment positioning tooth which is provided at the basement or at a serration plate rotatably connected to the basement and which is adapted to mesh with the first fine adjustment positioning tooth.

In the static discharger according to the present invention, a tooth pitch of the positioning tooth of the first indexing mechanism corresponds to one degree within a range from 4 to 14 arc degrees, and a tooth pitch of the fine adjustment positioning teeth of the second indexing mechanism corresponds to one degree within a range from 0.5 to 1.5 arc degrees.

In the static discharger according to the present invention, the first indexing mechanism and/or the second indexing mechanism further comprise a scale.

In the static discharger according to the present invention, the installation orientation adjustment mechanism comprises a first shaft member and a shaft hole formed in the discharger body, and the first shaft member is adapted to be inserted in the shaft hole so as to a allow and guide the discharger body to rotate with respect to the basement.

In the static discharger according to the present invention, the first shaft member and the basement are formed separately, and the first shaft member is adapted to pass through a first through hole formed at the basement, or the first shaft member and the basement are integrally formed or fixedly connected.

In the static discharger according to the present invention, the discharger body comprises a discharging portion and an internal-media, the internal-media being adapted to be fittingly received in a receiving groove formed at the discharging portion so as to restrict the rotation of the discharging portion with respect to the internal-media, and the shaft hole is formed in the internal-media.

In the static discharger according to the present invention, the shaft hole is a through hole, and an distal end of the first shaft member is provided with threads, and the static discharger further comprises a first nut which constitutes a part of the first fixing mechanism, the first nut being adapted to be thread-connected with the distal end of the first shaft member protruding out of the shaft hole so as to fix the internal-media to the basement, and thereby the first shaft member doubling as a part of the first fixing mechanism.

In the static discharger according to the present invention, the intermediate body is of a plate shape, a circular hole is formed at the intermediate body, and the internal-media adapted to be received in the circular hole, and the first positioning tooth is an outer positioning tooth provided at an outer periphery of the internal-media, and the second positioning tooth is an inner positioning tooth provided at an inner peripheral wall of the circular hole, or the intermediate body is of a plate shape, a circular convex portion is formed at the intermediate body), and a circular groove adapted to receive the circular convex portion is formed at the internal-media, and the first positioning tooth is an inner positioning tooth provided at an inner peripheral wall of the circular groove, and the second positioning tooth is an outer positioning tooth provided at an outer periphery of the circular convex portion.

In the static discharger according to the present invention, the installation orientation adjusting mechanism further comprises a second shaft member and a slot formed in the intermediate body, and the second shaft member is adapted to be inserted in the slot so as to allow and guide the intermediate body and the internal-media, which have meshed with each other by means of the first indexing mechanism, to rotate with respect to the basement with the first shaft member as a rotational center.

In the static discharger according to the present invention, the second shaft member and the basement are formed separately, and the second shaft member is adapted to pass through a second through hole formed at the basement, or the second shaft member and the basement are integrally formed or fixedly connected.

In the static discharger according to the present invention, the second fine adjustment positioning tooth is provided at the serration plate, and the serration plate is arranged between the basement and the intermediate body, an orifice is formed in the serration plate, and the second shaft member is also adapted to be inserted in the orifice so as to allow the serration plate to rotate with the second shaft as a rotational center.

In the static discharger according to the present invention, a distal end of the second shaft member is provided with threads, and the static discharger further comprises a second nut which constitutes a part of the first fixing mechanism, the second nut being adapted to be thread-connected with the distal end of the second shaft member protruding out of the orifice and the slot so as to fix the intermediate body and the serration plate to the basement, and thereby the second shaft member doubling as a part of the first fixing mechanism.

In the static discharger according to the present invention, the first fine adjustment positioning tooth is parallel positioning serrations provided at a surface of the intermediate body facing the serration plate, and the second fine adjustment positioning tooth is parallel positioning serrations provided at a surface of the serration plate facing the intermediate body.

In the static discharger according to the present invention, the surface of the intermediate body provided with the first fine adjustment positioning tooth is a concave surface adapted to fittingly receive the serration plate.

In the static discharger according to the present invention, a second fixing mechanism adapted to fix the discharging portion to the internal-media is further included.

In the static discharger according to the present invention, the second fixing mechanism comprises: an anchoring hole formed in the discharging portion and being in communication with the receiving groove; a recess formed in the internal-media; and an anchoring member, and the recess is adapted to receive a front end of the anchoring member passing through the anchoring hole.

In the aircraft according to the present invention, the static discharger is provided at a trailing edge profile member, which is configured as the supporting and conductive structure, of an elevator, a rudder, an aileron of a wing and/or a winglet of a wing of the aircraft.

In the installation process according to the present invention, the static discharger further comprises an indexing mechanism adapted to adjust a magnitude of a rotation angle of the discharger body with respect to the basement in an indexing manner, and the step of adjusting the installation orientation of the discharger body with respect to the basement further comprises: adjusting and identifying, by means of the indexing mechanism, the magnitude of the rotation angle of the discharger body with respect to the basement.

In the application documents, use of orientation terms such as "up", "down", "top", "bottom", and so on, is merely for description purpose, and should not be regarded as a limitation. For example, the upper surface of the basement described in relation to a static discharger installed on an elevator is changed into a left/right side surface in the geographical sense described in relation to a static discharger installed on a rudder because the static discharger is rotated at 90 degrees. In addition, in the application documents, the orientation term "front" generally corresponds to the nose direction of the airplane and the orientation term "rear" generally corresponds to tail direction of the airplane.

In the application documents, when referring to "exemplary embodiment", "some examples", "other examples", and so on, it means that detailed features, structures or characteristics described in relation to the embodiment/example are included in at least one of the embodiments/examples of the present invention, and the appearance of these words in the present invention does not necessarily denote the same embodiment/example. In addition, when detailed features, structures or characteristics are described in relation to any of the embodiments/examples, it should be considered that these features, structures or characteristics can also be achieved by the skilled in the art in other embodiments/examples of all of the embodiments/examples.

While the present invention has been described with reference to the exemplary embodiment, it should be understood that the present invention is not limited to the specific embodiments/examples described and illustrated in detail herein, and those skilled in the art can also make various modifications to the exemplary embodiment without departing from the protection scope defined by the claims.

The invention claimed is:

1. A static discharger, comprising:
   a basement adapted to be installed to a supporting and conductive structure of a moving body; and
   a discharger body adapted to be installed to the basement,
   wherein an installation orientation adjusting mechanism is provided between the basement and the discharger body, the installation orientation adjusting mechanism allowing the discharger body to be rotationally orientated, with respect to the basement, to a predetermined installation orientation during an on-site-installation of the static discharger, and
   the static discharger further comprises a first fixing mechanism adapted to fix the discharger body, which has been oriented to the predetermined installation orientation, to the basement.

2. The static discharger according to claim 1, further comprising an indexing mechanism adapted to adjust a magnitude of a rotation angle of the discharger body with respect to the basement in an indexing manner.

3. The static discharger according to claim 2, wherein the indexing mechanism comprises a first indexing mechanism adapted to roughly adjust the magnitude of the rotation angle, and
the first indexing mechanism comprises: a first positioning tooth provided at the discharger body and distributed in a circumferential direction; and a second positioning tooth provided at the basement or at an intermediate body, adapted to mesh with the first positioning tooth and distributed in a circumferential direction, the intermediate body being arranged between the basement and the discharger body.

4. The static discharger according claim 3, wherein the second positioning tooth is provided at the intermediate body,
the indexing mechanism further comprises a second indexing mechanism adapted to finely adjust the magnitude of the rotation angle, and
the second indexing mechanism comprises: a first fine adjustment positioning tooth provided at the intermediate body; and a second fine adjustment positioning tooth which is provided at the basement or at a serration plate rotatably connected to the basement and which is adapted to mesh with the first fine adjustment positioning tooth.

5. The static discharger according to claim 4, wherein a tooth pitch of the positioning tooth of the first indexing mechanism corresponds to one degree within a range from 4 to 14 arc degrees, and a tooth pitch of the fine adjustment positioning teeth of the second indexing mechanism corresponds to one degree within a range from 0.5 to 1.5 arc degrees.

6. The static discharger according to claim 4, wherein the first indexing mechanism and/or the second indexing mechanism further comprise a scale.

7. The static discharger according to claim 4, wherein the installation orientation adjustment mechanism comprises a first shaft member and a shaft hole formed in the discharger body, and the first shaft member is adapted to be inserted in the shaft hole so as to allow and guide the discharger body to rotate with respect to the basement.

8. The static discharger according to claim 7, wherein the first shaft member and the basement are formed separately, and the first shaft member is adapted to pass through a first through hole formed at the basement, or
the first shaft member and the basement are integrally formed or fixedly connected.

9. The static discharger according to claim 7, wherein the discharger body comprises a discharging portion and an internal-media, the internal-media being adapted to be fittingly received in a receiving groove formed at the discharging portion so as to restrict the rotation of the discharging portion with respect to the internal-media, and
the shaft hole is formed in the internal-media.

10. The static discharger according to claim 9, wherein the shaft hole is a through hole, and an distal end of the first shaft member is provided with threads, and
the static discharger further comprises a first nut which constitutes a part of the first fixing mechanism, the first nut being adapted to be thread-connected with the distal end of the first shaft member protruding out of the shaft hole so as to fix the internal-media to the basement, and thereby the first shaft member doubling as a part of the first fixing mechanism.

11. The static discharger according to claim 9, wherein
the intermediate body is of a plate shape, a circular hole is formed at the intermediate body, and the internal-media is adapted to the received in the circular hole, and wherein the first positioning tooth is an outer positioning tooth provided at an outer periphery of the internal-media, and the second positioning tooth is an inner positioning tooth provided at an inner peripheral wall of the circular hole, or
the intermediate body is of a plate shape, a circular convex portion is formed at t e intermediate body, and a circular groove adapted to receive the circular convex portion is formed at the internal-media, and wherein the first positioning tooth is an inner positioning tooth provided at an inner peripheral wall of the circular groove, and the second positioning tooth is an outer positioning tooth provided at an outer periphery of the circular convex portion.

12. The static discharger according to claim 11, wherein the installation orientation adjusting mechanism further comprises a second shaft member and a slot formed in the intermediate body, and the second shaft member is adapted to be inserted the slot so as to allow and guide the intermediate body and the internal-media, which have meshed with each other by means of the first indexing mechanism, to rotate with respect to the basement with the first shaft member as a rotational center.

13. The static discharger according to claim 12, wherein the second shaft member and the basement are formed separately, and the second shaft member is adapted to pass through a second through hole formed at the basement, or
the second shaft member and the basement are integrally formed or fixedly connected.

14. The static discharger according to claim 12, wherein the second fine adjustment positioning tooth is provided at the serration plate, and
the serration plate is arranged between the basement and the intermediate body, an orifice is formed in the serration plate, and the second shaft member is also adapted to be inserted in the orifice so as to allow the serration plate to rotate with the second shaft as a rotational center.

15. The static discharger according to claim 14, wherein a distal end of the second shaft member is provided with threads, and
the static discharger further comprises a second nut which constitutes apart of the first fixing mechanism, the second nut being adapted to be thread-connected with the distal end of the second shaft member protruding out of the orifice and the slot so as to fix the intermediate body and the serration plate to the basement, and thereby the second shaft member doubling as a part of the first fixing mechanism.

16. The static discharger according to claim 14, wherein the first fine adjustment positioning tooth is parallel positioning serrations provided at a surface of the intermediate body facing the serration plate, and the second fine adjustment positioning tooth is parallel positioning serrations provided at a surface of the serration plate facing the intermediate body.

17. The static discharger according to claim 16, wherein the surface of the intermediate body provided with the first fine adjustment positioning tooth is a concave surface adapted to fittingly receive the serration plate.

18. The static discharger according to claim 9, further comprising a second fixing mechanism adapted to fix the discharging portion to the internal-media.

19. The static discharger according to claim 18, wherein the second fixing mechanism comprises: an anchoring hole formed in the discharging portion and being in communication with the receiving groove; a recess formed in the internal-media; and an anchoring member, and the recess is adapted to receive a front end of the anchoring member passing through the anchoring hole.

20. An aircraft, wherein the aircraft comprises the static discharger according to claim 1.

21. The aircraft according to claim 20, wherein the static discharger is provided at a trailing edge profile member, which is configured as the supporting and conductive structure, of an elevator, a rudder, an aileron of a wing and/or a winglet of a wing of the aircraft.

22. An installation process for installing the static discharger according to claim 1 to the supporting and conductive structure of the moving body, wherein the installation process comprises the following steps:

determining a basement installation orientation of the basement with respect to the supporting and conductive structure on an installation site in order that the basement can be superposed on the supporting and conductive structure to the greatest extent;

determining a discharger body installation orientation of the discharger body with respect to the basement on the installation site in order that the discharger body can be orientated to be in line with a moving direction of the moving body;

adjusting, based on the determined discharger body installation orientation and by means of the installation orientation adjusting mechanism, an installation orientation of the discharger body with respect to the basement, and then fixing the discharger body to the basement by means of the first fixing mechanism; and installing, based on the determined basement installation orientation, the basement together with the discharger body which has been fixed to the basement to the supporting and conductive structure.

23. The installation process according to claim 22, wherein the static discharger further comprises an indexing mechanism adapted to adjust a magnitude of a rotation angle of the discharger body with respect to the basement in an indexing manner, and the step of adjusting the installation orientation of the discharger body with respect to the basement further comprises: adjusting and identifying, by means of the indexing mechanism, the magnitude of the rotation angle of the discharger body with respect to the basement.

* * * * *